Feb. 9, 1926.
E. HODGKINSON
RECORDING INSTRUMENT
Filed Nov. 12, 1921
1,572,207
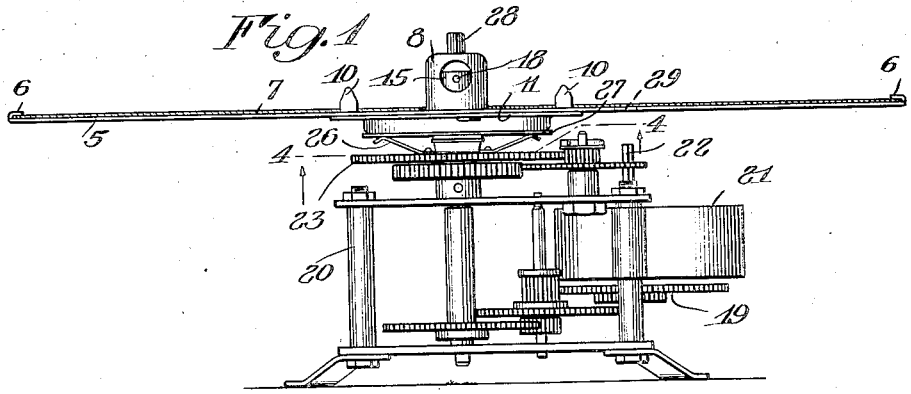
INVENTOR.
Edwin Hodgkinson
BY
his ATTORNEY Patented Feb. 9, 1926.

1,572,207

UNITED STATES PATENT OFFICE.

EDWIN HODGKINSON, OF ROCHESTER, NEW YORK, ASSIGNOR TO TAYLOR COMPANIES, OF ROCHESTER, NEW YORK, A CORPORATION OF NEW YORK.

RECORDING INSTRUMENT.

Application filed November 12, 1921. Serial No. 514,505.

*To all whom it may concern:*

Be it known that I, EDWIN HODGKINSON, of Rochester, in the county of Monroe and State of New York, have invented certain new and useful Improvements in Recording Instruments; and I do hereby declare the following to be a full, clear, and exact description of the same, reference being had to the accompanying drawings, forming a part of this specification, and to the reference numerals marked thereon.

This invention relates to recording instruments, and, more particularly, to those in which a recording surface is driven by a timing mechanism, in cooperation with a movable marking element responsive to the conditions to be recorded, such, for example, as the temperature or pressure recording instruments well known in the art. One object of the invention is to provide such an instrument having a yieldable driving connection between the timing mechanism and the recording surface, so that the latter may be readily shifted in position, independently of the timing mechanism, and without removal from the latter, to bring any portion of its surface under the recording element, as convenient for registering the element with any desired time indicia on the surface. In some instruments of this type the indicating surface is so arranged that it covers and obstructs the stem or other winding means for the timing mechanism and requires removal whenever the latter is wound. Another object of the invention is to overcome this difficulty by providing the yieldably supported recording surface with an opening arranged to be brought opposite the winding stem to afford access to the latter by adjustment of the surface as described.

Still a further object is to provide a simple and practical construction affording the above and other advantages, the parts of which do not require detachment in operation and are not therefore subject to being misplaced or lost. To these and other ends the invention resides in certain improvements and combinations of parts all as will hereinafter be more fully described, the novel features being pointed out in the claims at the end of the specification.

In the drawings:

Figure 1 is a side elevation of a portion of a recording apparatus having the invention applied thereto;

Figure 2 is an enlarged central sectional elevation of parts shown in Figure 1.

Figure 3 is a fragmentary plan view of the central portion of the supporting means for the recording surface; and Figure 4 is a fragmentary sectional view on the line $4^a$—$4^a$ of Figure 1.

Similar reference numerals theroughout the several views indicate the same parts.

The embodiment of the invention selected for the purposes of the present disclosure shows the same as applied to a temperature or pressure recording instrument of the well known variety comprising a chart holding disc rotated by a timing mechanism in cooperation with a marking element responsive to conditions to be recorded for producing a continuous record over a given period of time, such, for example, as the type of instrument disclosed in my prior Patent No. 1,063,349 granted June 3, 1913, for "Indicator and recorder". Referring more particularly to the drawings, there is shown at 5, Figures 1 and 2, a supporting means or plate in the form of a circular disc provided about its periphery with keepers or fingers 6 for holding on the disc the circular recording surface or chart 7, according to a common form of arrangement. The chart supporting disc in the present instance, however, is formed centrally with a cylindrical projection, or boss 8, adapted to be received in the usual central opening 9 of a chart disc to center the latter. In addition the chart holder has projecting upwardly therefrom on opposite sides a pair of pointed ears 10 adapted to pierce the chart and hold the same against rotation relative to the holder. This construction admits of the application of a chart to the holder quickly and conveniently and provides effective support for the same in operation.

The chart holding disc is supported from below by a circular plate 11 preferably formed of sheet metal in the shape illustrated. That is to say, this plate is provided with a rearwardly projecting annular surface 12 forming one of the frictionally engaging elements employed to drive the chart holder. The chart holding ears 10 already described are struck up adjacent the periphery of plate 11 and inserted through slots in the chart disc 5, and the latter has similar ears 13 struck rearwardly therefrom and passed through slots in plate 11, so that the chart holder and the plate 11 are thus securely fastened together.

Plate 11 has a central circular opening 14 the periphery of which is in bearing engagement with a sleeve 15 carried by a spindle 16 extending from the timing mechanism described hereafter. Sleeve 15 is formed with a shoulder 17, the rear side of which engages plate 11 and the periphery of which engages the inner walls of boss 8 of the chart holder. Sleeve 15 is preferably fixed to the timing mechanism spindle 16 as by means of a pin 18, and it is evident that the chart holder and its plate 11 are thus prevented from moving outwardly longitudinally of the sleeve and spindle, but are centered by the latter, having an accurate fit thereon sufficiently loose, however, to permit the chart holder to be freely rotated relatively to the sleeve.

The timing mechanism, or clock, indicated generally at 19, Figure 1, may have any usual or suitable construction well known in the art and therefore requires no detailed description. This part of the mechanism is supported in a frame indicated generally at 20 and is driven by a motor spring 21 wound by a key fitted to its stem 22. The timing train rotates a terminal part or gear 23 rotatably supported on a bearing formed at the inner end of sleeve 15. This gear carries a frictional element cooperating with the annular frictional surface 12 on the chart holder, for yieldably driving the latter. In the present instance this frictional element is in the form of a device stamped up from resilient sheet metal and comprising a central ring portion 24 rotatably received on sleeve 15 and secured to gear 23 as by means of rivets 25. Ring 24 carries a plurality of resilient fingers 26 shaped as shown to form frictional surfaces for engagement with the annular surface 12 of the chart holder. The parts are so assembled that the resilient fingers 26 are placed under sufficient tension to maintain the desired frictional pressure against the cooperating surface 12. Preferably a disc 27 of fiber board, or any other suitable material, is carried on sleeve 15 so as to extend between the frictional surface 12 and fingers 26 to improve the frictional action. By means of this construction the gear 23 driven by the time train is provided with a yieldable driving connection with the chart holder, adapted to transmit sufficient force for operating the latter. The frictional engagement is such, however, that the chart holder may be readily adjusted or rotated by hand independently of the timing mechanism, through slippage between the frictional elements, so that when a chart is initially placed on the holder, or at any other time, the latter may be conveniently rotated by hand to bring any portion of the chart bearing any given time indicia under the marking element. This it is to be noted may be quickly accomplished without adjusting loosening or removing any nuts or other securing means, or the chart holder itself, thus eliminating the objection to the use of detachable parts arising from the fact that such parts are frequently misplaced and lost.

The manual adjustment of the chart holder may be accomplished by grasping the edges of the same, but as the latter are not always accessibly spaced from the instrument casing, the central boss 8 is made of sufficient size to be grasped by the hand for this purpose. Preferably, however, boss 8 carries an angular post 28 with which a key may be conveniently engaged to adjust the chart.

The chart disk extends over the winding stem 22 of the time train, as is frequently desirable to obtain compactness in instruments of the variety, and the holder is therefore provided with an opening 29 located so that it may be brought by rotation of the holder into registry with the winding stem. A winding key may then be inserted through the opening to wind the clock without requiring the removal of any of the parts of the apparatus.

In operation a used chart may be quickly removed from the holder and a new chart conveniently and securely fastened thereon without adjusting or removing any parts on the mechanism. The holder is then rotated as described to bring the desired starting portion of the chart under the marking element, and the timing mechanism then rotates the chart to make a continuous record, as usual in instruments of this type. When the timing mechanism requires to be wound, all that is necessary is to locate the shart holder, with the chart removed to bring the opening 29 over the winding stem. As apparent from the drawings the construction is simple, durable and reliable in character. There are no detachable parts to be misplaced or lost and the chart holder may be adjusted at any time by simply turning the same by hand without adjusting any securing devices.

I claim as my invention:

1. In a recording apparatus, the combination of a time train, a rotarily supported record chart disk, an element provided with a frictional surface secured to said disk, and an element having a cooperating frictional surface driven by said train one of said elements being formed of resilient metal for maintaining engagement with the other to provide a yieldable driving connection for said chart disk.

2. In a recording apparatus, the combination of a time train, a spindle, a chart disk rotatable on said spindle, retaining means for holding said disk against movement in one direction longitudinally of the spindle, a part rotated by said train and elements secured to said part and disk in frictional engagement with each other and forming a yieldable driving connection for said disk.

3. In a recording apparatus, the combination of a time train, a member rotated thereby, and a ratatably supported chart holder, said member and disk being provided with an annular frictional element on one and a plurality of spring fingers on the other cooperating with said element to form a yieldable driving connection for said disk.

4. In a recording apparatus, the combination of a time train having a spindle, a chart supporting disk rotatably supported on the spindle, an annular frictional surface on said disk, a member rotated by the time train, and a frictional element of resilient metal fixed on said member and pressing against said annular surface to form a yieldable driving connection between said train and disk.

5. In a recording apparatus, a rotatably supported chart holding disk, a time train, a part rotated by said train, cooperating frictional elements on said disk and part provided with means for maintaining them in engagement with each other to form a yieldable driving connection between said disk and train, and a device on the disk registering with the central opening of a chart for rotatably adjusting the disk independently of the time train.

EDWIN HODGKINSON.